US009151862B2

(12) United States Patent
Richardson

(10) Patent No.: US 9,151,862 B2
(45) Date of Patent: Oct. 6, 2015

(54) BURIED OBJECT DETECTOR

(71) Applicant: Roke Manor Research Limited, Romsey, Hampshire (GB)

(72) Inventor: Chris Richardson, Romsey (GB)

(73) Assignee: Roke Manor Research Limited, Romsey Hampshire (GB)

( * ) Notice: Subject to any disclaimer, the term of this patent is extended or adjusted under 35 U.S.C. 154(b) by 159 days.

(21) Appl. No.: 13/734,486

(22) Filed: Jan. 4, 2013

(65) Prior Publication Data

US 2013/0181718 A1    Jul. 18, 2013

(30) Foreign Application Priority Data

Jan. 12, 2012  (GB) .................................. 1200488.3

(51) Int. Cl.
*G01V 3/10* (2006.01)
*G01V 3/15* (2006.01)
(52) U.S. Cl.
CPC ......... *G01V 3/101* (2013.01); *G01V 3/15* (2013.01); *G01V 3/107* (2013.01)
(58) Field of Classification Search
CPC ......... G01V 3/104; G01V 3/08; G01V 3/107; G01V 3/108; G01V 3/101; G01S 13/888; G01S 13/04; G01S 13/885; G01S 5/04; E02F 9/26; H04L 67/24; G06K 9/3241; G06K 2017/0045; G06K 7/10336; G06K 7/10346; G08B 13/2471; G08B 13/2474; H02J 7/025; G01L 1/205; H01F 38/14
USPC .................. 324/67, 207.11, 207.22, 326–329
See application file for complete search history.

(56) References Cited

U.S. PATENT DOCUMENTS

| | | | | |
|---|---|---|---|---|
| 3,329,906 A | * | 7/1967 | Bringert | 331/65 |
| 3,612,986 A | * | 10/1971 | Rollwitz et al. | 324/209 |
| 3,742,341 A | * | 6/1973 | Clowes et al. | 324/329 |
| 3,764,892 A | * | 10/1973 | Rollwitz | 324/322 |
| 3,836,842 A | * | 9/1974 | Zimmermann et al. | 324/239 |
| 3,961,238 A | * | 6/1976 | Randolph, Jr. | 324/327 |
| 4,006,481 A | * | 2/1977 | Young et al. | 343/770 |
| 4,030,026 A | * | 6/1977 | Payne | 324/329 |
| 4,095,167 A | * | 6/1978 | Weber | 324/326 |

(Continued)

FOREIGN PATENT DOCUMENTS

| | | | | |
|---|---|---|---|---|
| EP | 0366221 | | 5/1990 | |
| EP | 0366221 A2 | * | 5/1990 | ............... G01V 3/10 |

(Continued)

OTHER PUBLICATIONS

TEKNETICS G2 Owner's Manual, First Texas Products, LLC. Copyright 2010.*

(Continued)

*Primary Examiner* — Patrick Assouad
*Assistant Examiner* — Sean Curtis
(74) *Attorney, Agent, or Firm* — Banner & Witcoff, Ltd.

(57) ABSTRACT

A buried object detector comprising: a loop antenna and an RF source, the RF source coupled to the loop antenna and arranged to feed the loop antenna with an RF signal, the detector further comprising a detector circuit coupled to the loop antenna and arranged to detect changes in the quality factor of a resonant circuit formed by the loop antenna, wherein the loop antenna is arranged to magnetically couple with a buried object, thereby reducing the quality factor of the resonant circuit.

16 Claims, 4 Drawing Sheets

(56) References Cited

U.S. PATENT DOCUMENTS

| | | | |
|---|---|---|---|
| 4,130,792 A * | 12/1978 | Sullivan | 324/327 |
| 4,267,522 A * | 5/1981 | Periot | 331/65 |
| 4,837,511 A * | 6/1989 | Whittington et al. | 324/236 |
| 5,055,793 A * | 10/1991 | Mulcahey | 324/326 |
| 5,187,723 A * | 2/1993 | Mueller-Stuercken | 377/6 |
| 5,270,717 A * | 12/1993 | Schuermann | 342/22 |
| 5,512,834 A * | 4/1996 | McEwan | 324/642 |
| 5,907,242 A * | 5/1999 | Gard | 324/326 |
| 6,741,201 B1 * | 5/2004 | De Jongth et al. | 342/22 |
| 6,984,994 B2 * | 1/2006 | Gregg | 324/655 |
| 7,112,960 B2 * | 9/2006 | Miller et al. | 324/230 |
| 7,999,540 B2 * | 8/2011 | Miller et al. | 324/236 |
| 2003/0179000 A1 * | 9/2003 | Gregg | 324/655 |
| 2006/0049943 A1 * | 3/2006 | Sakashita et al. | 340/572.1 |
| 2006/0097737 A1 * | 5/2006 | Parker et al. | 324/754 |
| 2007/0046288 A1 * | 3/2007 | Westersten | 324/326 |
| 2007/0296415 A1 * | 12/2007 | Stamatescu | 324/345 |
| 2008/0036462 A1 * | 2/2008 | Schiano | 324/318 |
| 2010/0079136 A1 * | 4/2010 | Phillips et al. | 324/207.16 |
| 2011/0012806 A1 * | 1/2011 | Brown | 343/833 |
| 2013/0119992 A1 * | 5/2013 | Bailey | 324/326 |
| 2013/0131618 A1 * | 5/2013 | Abraham et al. | 604/361 |
| 2013/0181718 A1 * | 7/2013 | Richardson, Chris | 324/327 |

FOREIGN PATENT DOCUMENTS

| | | | | |
|---|---|---|---|---|
| EP | 0551606 A2 * | 7/1993 | | G01V 3/10 |
| EP | 0613026 | 8/1994 | | |
| EP | 0613026 A1 * | 8/1994 | | G01V 3/10 |
| EP | 0366221 A2 * | 5/1999 | | G01V 3/10 |
| EP | 1092988 A1 * | 4/2001 | | G01V 3/10 |

OTHER PUBLICATIONS

Rollwitz et al., Hidden Object Detection by Magnetoabsorption and Induction Methods, Southwest Research Institute: Department of Instrumentation Research, Jun. 1996.*
Lancaster, Electronic Metal Locators: Basic Types and Design Factors, Electronics World, Dec. 1996.*
First Examination Report for NZ605489 dated Jan. 14, 2013.
Patents Act 1977: Search Report under Section 17(5) for GB1200488.3 dated Apr. 11, 2012.
Integrated Circuits Data Sheet, HEF4046B, MSI, Phase-locked loop, Product Specification File under Integrated Circuits, IC04, Philips Semiconductors, Jan. 1995, 16 pages.
Patent Examination Report No. 1 AU 2013200130 dated May 26, 2014.

* cited by examiner

BURIED OBJECT DETECTOR

BACKGROUND

Hand held metal detectors are well known and may be used to detect metallic objects hidden in the ground or under a surface. Metal detectors operate by transmitting an alternating magnetic field into the ground or other surface. The reflected magnetic field is detected by a detector coil. Changes in the magnetic field due to the presence of metallic objects can then be detected. Metal detectors for the commercial and domestic markets have been available for many years.

SUMMARY

In a first aspect, the present invention provides a buried object detector comprising: a loop antenna and an RF source, the RF source coupled to the loop antenna and arranged to feed the loop antenna with an RF signal, the detector further comprising a detector circuit coupled to the loop antenna and arranged to detect changes in the quality factor of a resonant circuit formed by the loop antenna, wherein the loop antenna is arranged to magnetically couple with a buried object, thereby reducing the quality factor of the resonant circuit.

In a second aspect, the present invention provides a method of detecting a buried object, comprising: feeding a loop antenna with an RF signal; and detecting changes in the quality factor of a resonant circuit formed by the loop antenna; wherein the loop antenna is arranged to magnetically couple with a buried object, thereby reducing the quality factor of the resonant circuit.

Further aspects are described below.

BRIEF DESCRIPTION OF THE DRAWINGS

The present invention will now be described by way of example only and with reference to the accompanying drawings, in which.

DETAILED DESCRIPTION

Figure 1:
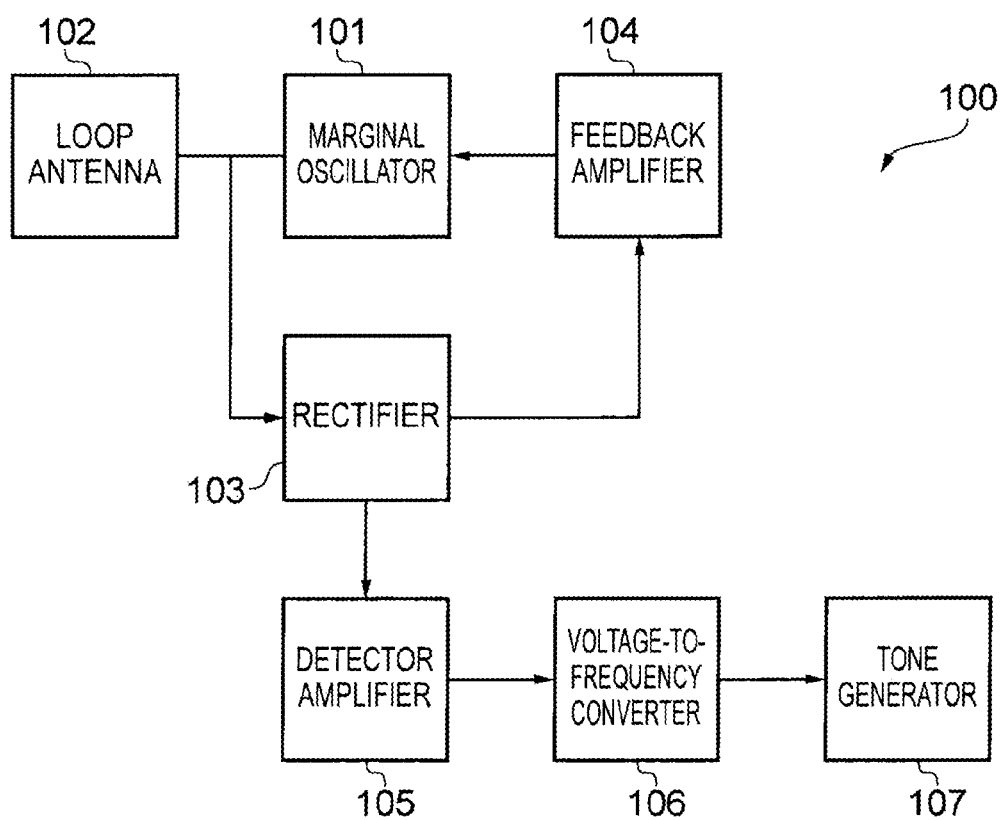
FIG. 1 is a block diagram showing the components of a buried object detector in accordance with a first embodiment of the present invention

FIG. 1 shows the components of a buried object detector 100 in accordance with a first embodiment of the present invention. The buried object detector 100 includes a marginal oscillator 101. The marginal oscillator 101 is coupled to a loop antenna 102. Together, the marginal oscillator 101 and the loop antenna 102 form a tuned resonance circuit. The circuit is tuned to oscillate at a predefined frequency (e.g., 15 MHz). The antenna may consist of an aluminium strip bent to form a loop of a predefined diameter (e.g., 15 cm).

An output of the marginal oscillator 101 is fed to a rectifier 103. An output of the rectifier 103 is coupled to feedback amplifier 104. The feedback amplifier 104 acts as a slow control loop for marginal oscillator 101. An output of the rectifier 103 is also fed to detector amplifier 105. The detector amplifier 105 is coupled to voltage-to-frequency converter 106 which is in turn coupled to tone generator 107.

Figure 2:
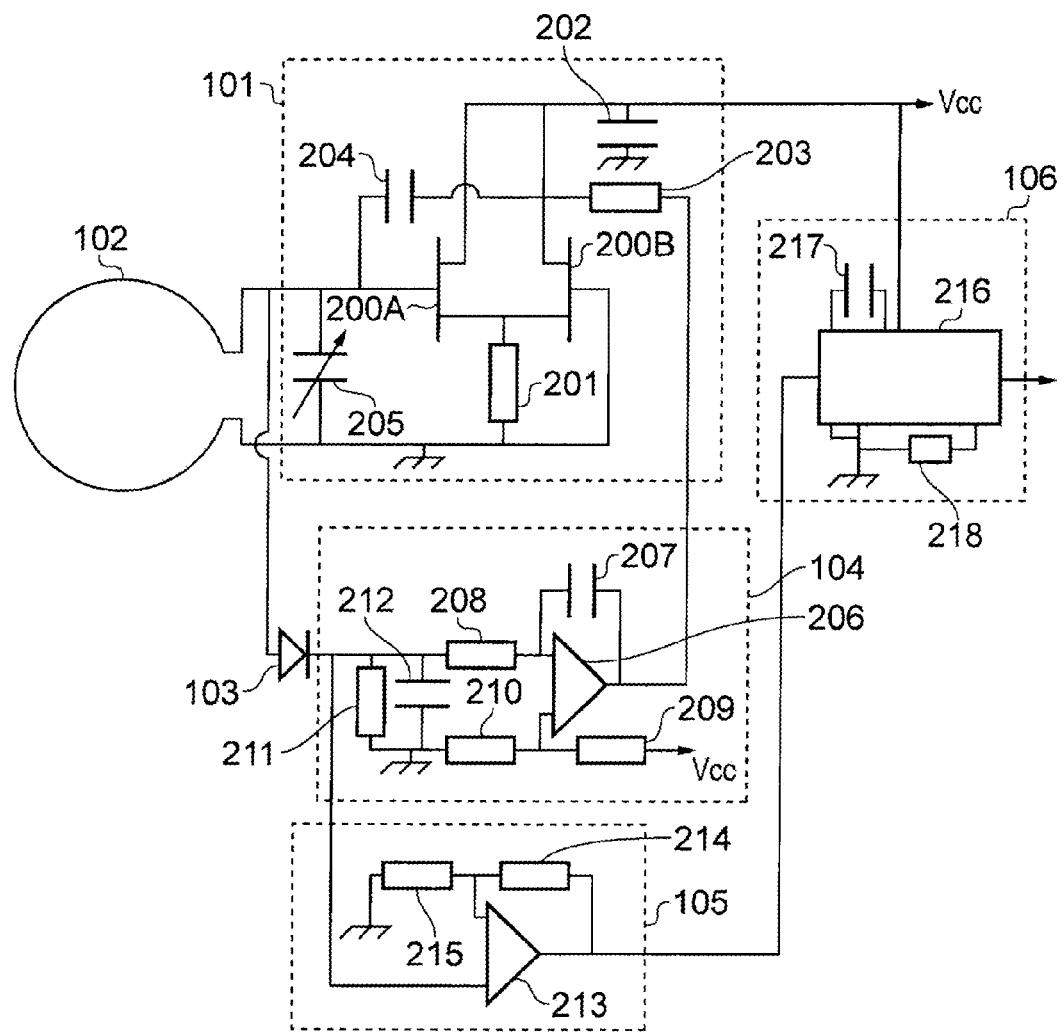
FIG. 2 is a circuit diagram of the buried object detector shown in FIG. 1 according to various aspects.

FIG. 2 is a circuit diagram for the buried object detector 100. The marginal oscillator 101 comprises two FET devices 200A and 200B. A suitable FET for this application is the BF245B MOSFET which is produced by various manufacturers. The source of FET 200A is coupled to the common collector voltage (VCC). The drain of FET 200A and the drain of FET 200B are coupled to each other and to resistor 201 which is coupled to ground. Resistor 201 may take a value of 1 kΩ. The gate connection of FET 200B is also coupled to ground. The source connection of FET 200A is also coupled to capacitor 202, which may take a value of 10 nF and is also coupled to ground.

The source connection of FET 200B is coupled to resistor 203, which may take a value of 3.9 kΩ. Resistor 203 is also coupled to the output of feedback oscillator 104. The source of FET 200B is also coupled to capacitor 204 which is in turn coupled to the gate connection of FET 200A. Capacitor 204 may take a value of 4.7 pF. The gate connector of FET 200A is also coupled to variable capacitor 205 which is in turn coupled to ground. Variable capacitor 205 may take a nominal value of 220 pF. The variable capacitor 205 may be used to adjust the frequency of oscillation of marginal oscillator 101. Loop antenna 102 is coupled in series between the gate connector of FET 200A and the gate connector of FET 200B. The gate connector of FET 200A acts as the output of oscillator 101 which is fed to rectifier 103. Rectifier 103 may be a 5082-2835 diode, as manufactured by various companies. The rectifier 103 converts the output of marginal oscillator 101 to a DC voltage. The output of rectifier 103 is fed to feedback amplifier 104 and to detector amplifier 105.

Feedback amplifier 104 may comprise a TLC271 operational amplifier 206. A 1 µF capacitor 207 is coupled between the inverting input (pin 2) and the output (pin 6) of amplifier 206. A resistor 208 (e.g., 10 MΩ) is coupled in series between the rectifier 103 output and the inverting input of the operation amplifier 206. The non-inverting input of the operational amplifier 206 (e.g., pin 3) is coupled to a potential divider consisting of resistor 209 (e.g., 10 kΩ) and a resistor 210 (e.g., 1 kΩ. Resistor 209 is coupled to the VCC and the resistor 210 is coupled to ground. The output of the rectifier 103 is also coupled to ground by the parallel combination of resistor 211 9 e.g., 10 MΩ) and the capacitor 212 (e.g., 1 nF). The feedback amplifier 104 forms a very slow control loop which has a predetermined time constant (e.g., approximetly 10 seconds). The value of the time constant is set by resistor 208 and capacitor 207. The nominal oscillator output level is set by the value of the potential divider combination of resistors 209 and 210.

The output of rectifier 103 is also connected to detector amplifier 105. Detector amplifier 105 comprises an operational amplifier 213 which is may also be a TLC271 operational amplifier. A resistor 214 (e.g., 100 kΩ) is coupled between the inverting input of operational amplifier 213 (e.g., pin 2) and the output of the operational amplifier (e.g., pin 6). The inverting input of operational amplifier 213 is also coupled to ground via 1 kΩ resistor 215 (e.g., 1 kΩ). The output of rectifier 103 is coupled to the non-inverting input of operational amplifier 213 (e.g., pin 3). The output of operational amplifier 213 (e.g., pin 6) is the output of detector amplifier 105 and is coupled to the voltage-to-frequency converter 106.

Voltage-to-frequency converter 106 comprises a integrated phase-lock loop circuit 216. In this example, the phase-lock loop circuit 216 may be an HEF4046 phase-lock loop integrated circuit. A capacitor 217 (e.g., 22 nF) may be coupled between pins 6 and 7 of the HEF4046 integrated circuit. Pin 16 the HEF4046 integrated circuit may be connected to VCC. The output of detector amplifier 105 may be coupled to pin 9 of the HEF4046 integrated circuit 216. Pins 3, 5, 8 and 14 of the HEF4046 integrated may all be coupled to ground. Pin 11 may be coupled to ground via resistor 218 (e.g., 10 kΩ). Pin 4 of the HEF4046 integrated circuit may be the circuit output which is fed to the tone generator 107.

The operation of the buried object detector 100 will now be described. The loop antenna 102 forms part of a resonant circuit with the marginal oscillator 101. The feedback amplifier 104 is adjusted so that the DC power level being fed to FET 200B is set to fix the oscillator at a nominal output level. When a lossy object is placed near the loop antenna 102, the Q factor of the circuit is reduced and the output of the marginal oscillator 101 dips for a few seconds before the feedback amplifier 104 compensates. The dip in voltage supplied to the voltage-to-frequency converter 106 causes a change in frequency supplied to the tone generator 107, thereby alerting a user to the presence of an object.

The device operates by monitoring the absorption of a radio frequency magnetic field which is generated by the loop antenna 102 and the marginal oscillator 101. A buried wire or pipe is tightly coupled to the ground around it at RF frequencies. The ground has a resistive loss at RF frequencies and therefore absorbs a proportion of any RF signal carried by a wire or pipe. A tuned loop (such as loop antenna 102) placed above the ground in which a wire or pipe is buried, magnetically couples with the wire or pipe. The resistive loss in the ground is transferred via the wire or pipe to the tuned loop. As a result, the quality factor of the tuned loop is reduced by the loss and the impedance across the ends of the tuned loop is reduced at its resonant frequency. Magnetic coupling occurs with both metallic and non-metallic objects, and the device may therefore be used to detect both metallic and non-metallic objects. The operating point of the marginal oscillator 101 is adjusted to be near its oscillation threshold by controlling its feedback gain. One feature of a marginal oscillator is that its oscillation level is extremely sensitive to the quality factor (Q) of the tank circuits (in this case the feedback amplifier 104) controlling the frequency. Absorption of the magnetic field can therefore be measured by monitoring the input power required to maintain oscillation as the loop antenna 102 is scanned over a lossy object, such as a pipe or wire.

A marginal oscillator is one example of how the present invention may be implemented. A buried object detector in accordance with an embodiment of the present invention may detect an object by directly measuring changes in certain measurable parameters, such as the impedance across the ends of the tuned loop, the RF voltage across the tuned loop, or the current running through it. It will be appreciated by the skilled person that various changes and modifications may be made to the buried object detector within the scope of the claims.

The detector 100 is most sensitive to lossy non-metallic objects when the object is at the centre of the loop antenna 102. However, the detector 100 is most sensitive to buried metallic wires or pipes when the loop is at right angles to the plane of the ground and in line with the pipe or wire. In this position, the loop is least sensitive to losses in the ground itself and therefore it is a preferred configuration for pipe and wire detection. Even a short piece of buried pipe or wire is affected by the surrounding lossy ground and therefore absorbs some of the RF power that is received from the detector loop 102.

The marginal oscillator 101 is extremely sensitive to all losses. The performance of the buried object detector 100 is therefore determined mainly by the discrimination between the loss due to the target and the loss due to the wall or ground. Examples of effects that can be used to achieve more discrimination are given below.

Stepping the frequency of the marginal oscillator 101 over a range of frequencies can supply additional information to discriminate between different non-metallic materials and the ground or wall. The loss characteristics or loss profile of each material varies differently with frequency. Sweeping widely over a buried object tends to produce sharp changes in the signal as the object is swept over and much slower changes from the surrounding ground. Discrimination can therefore be obtained just by filtering the detector output or shaping the time constant of the oscillator control loop in order to favour faster changing signals.

The detection of a buried wire or pipe is sensitive to the orientation of the antenna loop 102. If the plane of the loop is at right angles to the pipe or wire, there is a complete null in the signal and therefore no detection. In a further embodiment, the loop antenna may be mounted on a mechanically rotating disc. The detector 100 therefore produces a signal modulated at the rotation rate. Simple signal processing can easily extract the modulation.

In an alternative embodiment, two crossed antenna loops may be used. Each loop is connected to a separate detector system, each operating on slightly different frequencies. The output from the two detectors may then be added or subtracted to reduce the effects orientation or ground effects. Orientation effects can also be reduced using two crossed loops that form two independent tuned circuits coupled together, both feeding a single system. The main requirement of the latter option is that the RF signals radiated from the loops should be at phase quadrature to one another to prevent cancellation (at some loop orientations) within the pipe/wire. This can be achieved by connecting one tuned loop directly to the marginal oscillator and energising the second tuned loop with light inductive coupling to the first.

The systems described above may have problems with unwanted detection of long grass and poor performance in very wet ground. Poor electromagnetic coupling in the presence of local high level signals is also a problem. An alternative approach is to use a horizontal loop. Loss detection due to coupling between a horizontal loop and a wire is at a maximum when the loop (in any orientation) is placed either side of the wire. There is a distinctive very sharp null in the absorption when the loop is symmetrically over the top of the wire. Unfortunately, in this arrangement the loop is also very sensitive to the losses in the ground, with or without the target, and therefore, except at very short range, the detector performs badly because ground effects mask the wire loss. One method of reducing all these limitations is to make the detector sensitive only to the null when the centre of the horizontal loop passes over the wire. This may be done as follows.

Figure 3:
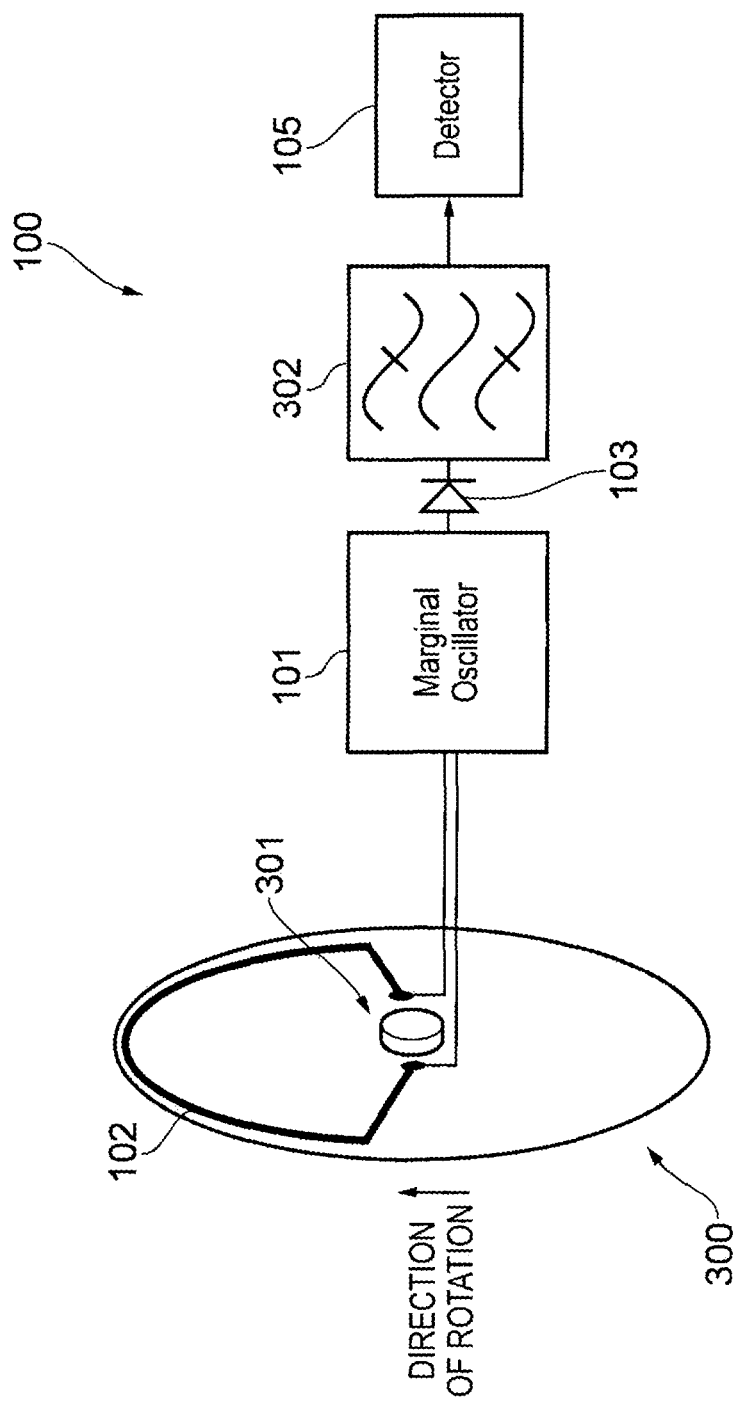
FIG. 3 is a block diagram showing the components of a buried object detector in accordance with a further embodiment of the present invention.

The electrical centre of the loop antenna could be rapidly scanned, electronically or mechanically, in a circular pattern. There are several ways of doing this. The circular scan could be easily achieved at a rate of at least a few tens of rotations per second. Using this system, when the loop is directly over a buried wire, the absorption null is passed twice for each complete revolution of the loop centre. The oscillator therefore produces an output modulated at double the frequency of the rotation, due only to the presence of the null. Ground and other unwanted effects due not produce a sharp null and only produce modulation at the fundamental frequency of the rotation. Note that the output from the detector can be a correlation of several rotations as the detector passes over the wire in a broader sweep of the ground. This results in much improved sensitivity. FIG. 3 shows a block diagram of a detector using a simple mechanical scan. A rotating disc 300 is rotatable by means of motor 301. The output of the rectifier is passed through bandpass filter 302.

Figure 4:
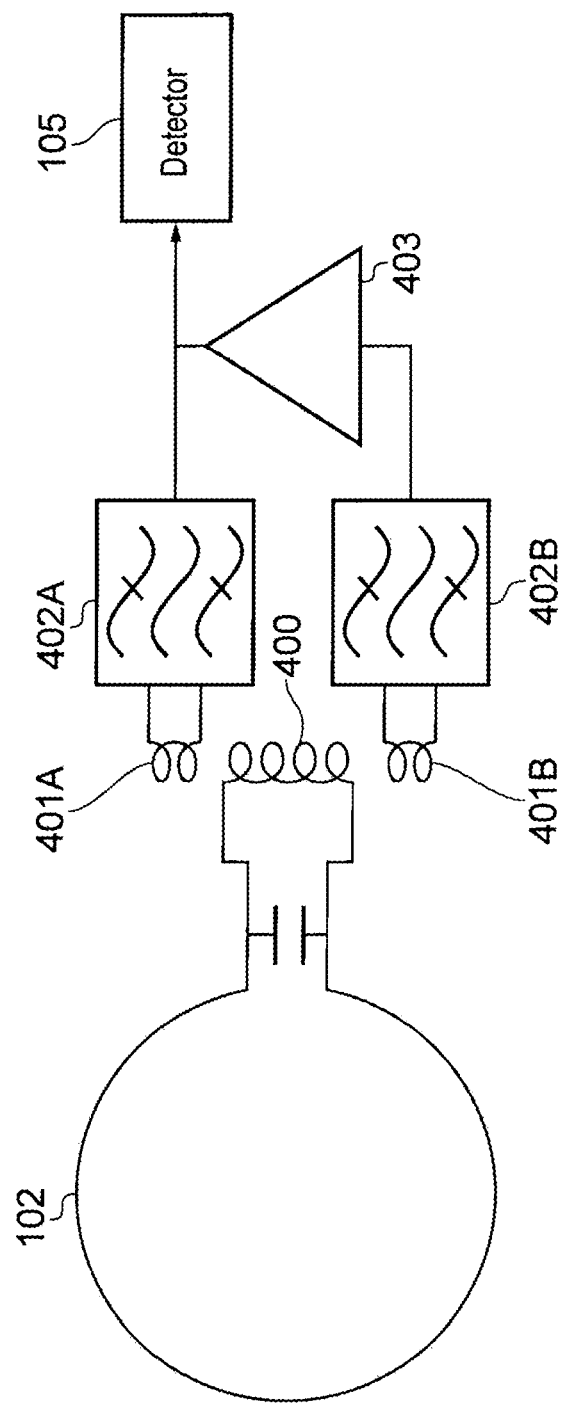
FIG. 4 is a block diagram showing the components of a buried object detector in accordance with a further embodiment of the present invention.

The marginal oscillator is a very sensitive device and it includes a large loop antenna. It is therefore very vulnerable to interference from strong local signals at any frequency. The oscillator circuit should therefore include filters to suppress signals outside its operating frequency range. An example of how this can be done is shown in FIG. 4. A coil 400 is connected across the tuned loop antenna, forming part of the resonant circuit. Two loops 401A, 401B are placed either side of the coil such that any coupling between the loops is predominantly via the resonant circuit. The loops are connected to the input and output of an amplifier 403 via bandpass filters 402A, 402B that are centred on the resonant frequency of the loop system. Oscillation occurs at the frequency of maximum coupling between the input and output of the amplifier (i.e. the resonant frequency of the loop system) provided that the input signal to the amplifier is in phase with its output. The polarity of the two loops and the delay characteristics of the filters must be taken into account in the circuit design to achieve this.

While the present invention has been described in connection with the detection of wires and pipes buried in the ground, it may also be used to detect other objects buried in a lossy material such as the ground. For example, it may be used to detect objects buried within the walls of a building.

The invention claimed is:

1. A buried object detector comprising: a loop antenna and an RF source, the RF source being coupled to the loop antenna and arranged to feed the loop antenna with an RF signal, wherein the RF source is a marginal oscillator, the buried object detector further comprising a detector circuit coupled to the loop antenna and arranged to detect changes in an output level of a resonant circuit formed by the loop antenna and the marginal oscillator, wherein the loop antenna is arranged to magnetically couple with a buried lossy object, thereby reducing a quality factor of the resonant circuit and varying the output level of the marginal oscillator.

2. A buried object detector according to claim 1, wherein the marginal oscillator further comprises a control loop, arranged to control feedback gain of the marginal oscillator.

3. A buried object detector according to claim 1, wherein said detector circuit comprises a tone generator arranged to generate a tone which varies in frequency dependent upon the output level of the marginal oscillator.

4. A buried object detector according to claim 3, wherein said detector circuit further comprises a voltage to frequency converter, an output of the marginal oscillator coupled to the voltage to frequency converter, and the voltage to frequency converter coupled to the tone generator.

5. A buried object detector according to claim 4, wherein said detector circuit further comprises a detector amplifier, coupled between the output of the marginal oscillator and voltage to frequency converter.

6. A buried object detector according to claim 5, wherein the detector circuit further comprises a output rectifier, coupled between the output of the marginal oscillator and the detector amplifier.

7. A buried object detector according to claim 2, wherein the control loop comprises an operation amplifier, arranged to control the feedback gain by adjusting a power supply voltage applied to the marginal oscillator.

8. A buried object detector according to claim 7, wherein the control loop comprises an RC element which determines a time constant of the control loop.

9. A buried object detector according to claim 8, wherein an output of the marginal oscillator is coupled to the control loop.

10. A buried object detector according to claim 2, wherein the marginal oscillator comprises a first transistor, and the control loop is coupled to an input of the first transistor.

11. A buried object detector according to claim 10, wherein the marginal oscillator further comprises a second transistor, and the loop antenna is coupled across said first and second transistors.

12. A buried object detector according to claim 11, wherein the marginal oscillator further comprises a variable capacitor, arranged to adjust a frequency of oscillation of the marginal oscillator.

13. A buried object detector according to claim 1, further comprising a rotating disc, wherein said loop antenna is mounted on said rotating disc.

14. A buried object detector according to claim 1, further comprising at least one filter, centred on an operating frequency of the marginal oscillator.

15. A buried object detector according to claim 1, wherein said loop antenna and said detector circuit are coupled via at least two coils.

16. A method of detecting a buried object, comprising:
feeding a loop antenna with an RF signal, wherein the RF signal is provided by a marginal oscillator; and
detecting changes in an output level of a resonant circuit formed by the loop antenna and the marginal oscillator; wherein the loop antenna is arranged to magnetically couple with a buried lossy object, thereby reducing a quality factor of the resonant circuit and varying the output level of the marginal oscillator.

* * * * *